P. E. HENNINGER.
COMMUTATING POLE CONSTRUCTION.
APPLICATION FILED JULY 25, 1918.
1,401,697.
Patented Dec. 27, 1921.
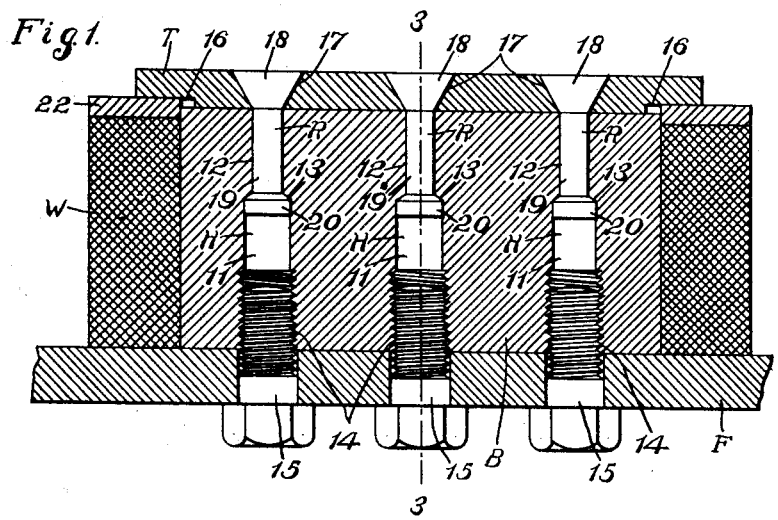
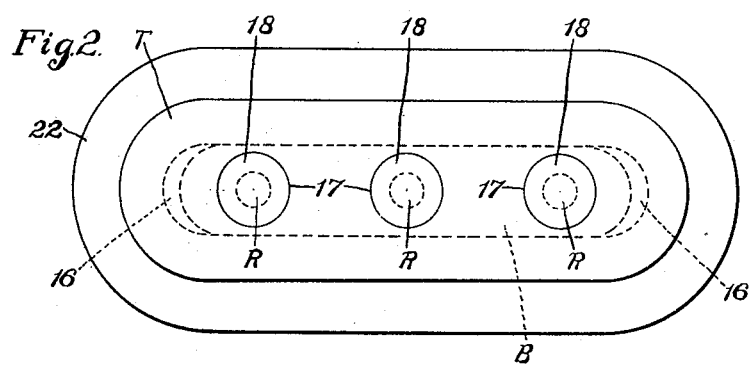
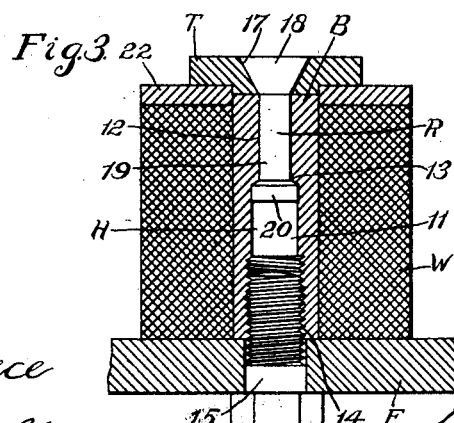
WITNESSES:
W. S. Reece
R. J. Fitzgerald
INVENTOR
Philip E. Henninger
BY
Wesley G. Carr
ATTORNEY

UNITED STATES PATENT OFFICE.

PHILIP E. HENNINGER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

COMMUTATING-POLE CONSTRUCTION.

1,401,697. Specification of Letters Patent. Patented Dec. 27, 1921.

Application filed July 25, 1918. Serial No. 246,761.

*To all whom it may concern:*

Be it known that I, PHILIP E. HENNINGER, a citizen of the United States, and a resident of Edgewood Park, in the county of Allegheny and State of Pennsylvania, have invented a new and useful Improvement in Commutating-Pole Construction, of which the following is a specification.

My invention relates to field-magnet pole pieces and a method of constructing the same. The invention is particularly applicable to the construction of commutating poles for large direct-current railway motors, but, of course, its application is not limited to such machines.

It is desirable, for mechanical and electrical reasons, to have the tips of the commutating poles of direct-current railway motors of larger area than the bodies, and several methods have been employed for obtaining such structures. One method, heretofore utilized for making field-magnet pole pieces of smaller motors, is to machine the pole-piece body and the tip from a piece of forged steel that is the size of the tip. The metal between the dimension of the tip and the body of the pole piece is lost by such method. Another method heretofore employed consists in separately forming the tip and the body of the pole piece, tapping holes in the body and fastening the tip to the pole piece by screws inserted into the tapped holes of the body. The heads of the screws are counter-sunk in and welded over at the face of the tip to keep them from backing out of the holes in the body. The face of the body opposite that to which the tip is secured is provided with tapped holes to receive stud bolts by means of which the poles are secured to the inner face of the machine frame.

The object of my invention is to eliminate expense in time, labor and material incident to the foregoing methods of construction.

In practising my invention, I form the body and the tip separately and provide these parts with a corresponding number of registering openings to receive the fastening devices. Holes are drilled into one side of the body of the pole piece and tapped to receive stud bolts for securing the pole piece to the machine frame. Holes of smaller diameter are drilled from the opposite face through to connect with the stud-bolt holes, thereby leaving a shoulder joining the two portions of the holes. The shanks of headed rivets are inserted through the holes in the tip into the holes of the body and the inner ends of said shanks are enlarged or upset to provide heads that abut against the aforesaid shoulders and secure the parts together and lock the fastening devices in place. This method avoids the loss of material incident to the machining method and eliminates the extra expense of screws, the extra time and labor of tapping the holes therefor, and the time and labor of welding the screw-heads to the pole tips and thereafter smoothing off the rough places incident to the welding operation.

The above and other objects and the novel features of this invention will be apparent from the following description taken in connection with the drawing in which Figure 1 is a longitudinal sectional view illustrating a commutating field-magnet pole piece embodying the invention, and disclosing a winding thereon and a portion of a dynamo-electric machine frame upon which the parts are mounted. Fig. 2 is a top plan view of the same, and Fig. 3 is a transverse sectional view taken on the line 3—3 of Fig. 1.

Referring to the drawing, B designates the forged steel body of the field-magnet pole piece, the same being elongated and provided with parallel side faces, parallel top and bottom faces and rounded ends. The body has three holes or openings H drilled therethrough and terminating in the top and bottom faces thereof. A portion 11 of each hole is first drilled part way through the body, and then a portion 12 of smaller diameter than the portion 11, is drilled from the top face of the body coaxially into the portion 11, thereby leaving a shoulder 13 between the portions 11 and 12. The taper of the shoulder 13 is due to the shape of the end of the tool used for drilling the portion 12. The portions of the holes near the bottom face of the body B are threaded, as at 14, to coöperate with the threaded stud bolts 15 which secure the pole to the inner face of the frame F.

The pole tip T consists of a plate of steel of greater area than the top face of the body B against which it abuts. The abutting side of the tip has an edge that is undercut at 16 to improve the magnetic characteristics of the tip. Tapering holes 17 are drilled through the tip, the inner ends of said holes being of the same diameter as, and registering with, the portions 12 of the body holes H.

The tips T are fastened to the body B by rivets R. The rivets have heads 18 that correspond to the shape of the holes 17 so they will be countersunk in the face of the tip when they are secured in place. The shanks 19 of the rivets may be passed through the holes 17 and 12 in the tip T and body B and are of such length that they project into the portions 11 of the holes H. The inner end of each rivet is then enlarged or upset to form a head 20 that abuts against the shoulder 13 and thereby draws the body and tip into abutting relation. The riveting tool is inserted through the larger portion 11 of the opening H, it being understood, of course, that the tip is secured to the body before the pole piece is mounted on the machine frame. A field-magnet winding W surrounds the body B and is held in position by a brass washer 22, the inner edge of which projects beneath the outer edge of the pole tip T.

While I have shown a preferred form of pole-piece construction, it will be understood that various changes may be resorted to without departing from the spirit of the invention.

I claim as my invention:

1. A field-magnet pole piece comprising a body provided with an opening extending therethrough, a tip portion having an opening therethrough that registers with the opening in said body, and a rivet one end of which is disposed flush with the surface of said pole tip and the remainder of which is totally inclosed within said openings.

2. A field-magnet pole piece comprising a body having an opening of varying diameter extending therethrough, a portion of said opening of larger diameter being threaded, a tip, and a rivet securing said tip to said body and having a part thereof disposed in a portion of said opening in said body that is of smaller diameter than said threaded portion, and a head disposed in a portion of the opening in said body that is of larger diameter.

3. A field-magnet pole piece comprising a body having openings extending therethrough, each of said openings having parts of different diameters joined by a shoulder, a tip having openings therethrough registering with the portions of said openings in said body that are of the smaller diameter, and rivets securing said tip to said body and having heads abutting against said shoulders, the portions of said openings of larger diameter being screw-threaded to receive bolts for securing said pole to a frame.

4. A field-magnet pole piece comprising a body having openings extending therethrough, each of said openings having parts of different diameters joined by a shoulder, a tip having openings therethrough registering with the portions of said openings in said body that are of the smaller diameter, and rivets securing said tip to said body, said rivets having heads countersunk in the openings in said tip and also having heads abutting against said shoulders.

In testimony whereof, I have hereunto subscribed my name this 8th day of July, 1918.

PHILIP E. HENNINGER.